United States Patent [19]

Casamatta

[11] 4,446,518

[45] May 1, 1984

[54] MICROPROGRAMMED CONTROL UNIT WITH MULTIPLE BRANCH CAPABILITY

[75] Inventor: Angelo Casamatta, Cornaredo, Italy

[73] Assignee: Honeywell Information Systems Inc., Waltham, Mass.

[21] Appl. No.: 319,811

[22] Filed: Nov. 9, 1981

[30] Foreign Application Priority Data

Dec. 18, 1980 [IT] Italy ............................... 26746 A/80

[51] Int. Cl.³ .............................................. G06F 9/22
[52] U.S. Cl. ...................................................... 364/200
[58] Field of Search ... 364/200 MS File, 900 MS File

[56] References Cited

U.S. PATENT DOCUMENTS

| | | | |
|---|---|---|---|
| 3,949,372 | 4/1976 | Brioschi | 364/200 |
| 3,979,725 | 9/1976 | Disparte et al. | 364/200 |
| 3,980,991 | 9/1976 | Mercurio | 364/200 |
| 3,983,541 | 9/1976 | Faber | 364/200 |
| 3,988,719 | 10/1976 | Whitby et al. | 364/200 |
| 4,038,643 | 7/1977 | Kim | 364/200 |
| 4,118,773 | 10/1978 | Raguin et al. | 364/200 |
| 4,307,445 | 12/1981 | Tredennick et al. | 364/200 |

OTHER PUBLICATIONS

A. K. Agrawala et al., "Foundations of Microprogramming", 1976, pp. 254–306.

*Primary Examiner*—Errol A. Krass
*Assistant Examiner*—David L. Clark

*Attorney, Agent, or Firm*—George Grayson; Nicholas Prasinos

[57] ABSTRACT

A microprogrammed control unit with multiple branch capability comprises in addition to a control memory, a first auxiliary read/write memory (21) having low parallelism and a second auxiliary read/write memory (30) having high parallelism. The reading of a microinstruction from the control memory also causes the reading of an information from the first auxiliary memory, such information being used to address the reading of the second auxiliary memory. The information read out from the second auxiliary memory specifies jump conditions (JC1, JC2, JC3) to be examined and jump addresses (JA1, JA2, JA3) and extends the information contained in the microinstruction read out from control memory.

Thus it is possible to associate jump (or branch) microinstructions to operative microinstructions and particularly multiple branch microinstructions to curtail the design time of the microprogram and the control memory size devoted to store them.

A priority network 40 coupled to the second auxiliary memory determines the priority to be followed during the concurrent examination of several jump conditions and selects the jump address among several possible addresses according to the highest priority verified jump condition.

4 Claims, 10 Drawing Figures

MICROPROGRAMMED CONTROL UNIT WITH MULTIPLE BRANCH CAPABILITY

BACKGROUND OF THE INVENTION

1. Field of the Invention

This invention relates to the microprogrammed control units used in data processing systems.

2. Description of the Prior Art

It is well known that modern data processing systems include a control unit which allows the system to interpret and execute instructions by means of suitable microprograms, the several program instructions forming the work program or programs assigned to the system. In other words, each instruction to be executed recalls a microprogram formed by several microinstructions and each microinstruction is executed during a machine cycle. Modern data processing systems are described, for example, in U.S. Pat. Nos. 3,812,464; 3,872,447; 3,956,738; 3,991,404; 3,949,372; and in several other patents.

The interpretation and the execution of each instruction generally require several machine cycles and the execution of several microinstructions of a microprogram. It is well known that the microinstructions are generally stored in a microprogram read only memory from which they are read out, one by one at each machine cycle, and decoded in a set of microcommands. These microcommands control the elementary operations of the processor during each machine cycle.

The expressive power of a microinstruction is limited by its parallelism, that is, by the number of bits composing it. The more bits in parallel, the greater the number of independent microcommands generated during the same machine cycle. Processor architecture and cost saving reasons generally lead to the use of a reduced microinstruction parallelism. Such parallelism is generally lower than that of which would be required in order to develop, at the same time, all the microcommands that the process or can execute during one machine cycle. Therefore, many operations which could be executed at the same time must be executed during subsequent machine cycles.

It is also well known, for example, that the microinstructions are generally classified in operative microinstructions and jump microinstructions. In an operative microinstruction, the constituting bits express in coded form some operative microcommands which actually control operations of addition, subtraction, comparison, transfer from register to register, etc. For such microinstructions, the read out of the subsequent microinstruction sequentially occurs by incrementing by one unit the address of the previous microinstruction. In fact, in the format of the operative microinstructions, there are not enough bits to specify the address of the next microinstruction in either absolute or relative terms; nor are there enough bits to provide, directly or indirectly, the address of a register within which the effective address of the subsequent microinstruction is stored.

By contrast, in a jump microinstruction the constituting bits express in coded form some microcommands which command some operations of non-sequential addressing of the next microinstruction and provide in an absolute or a relative way, directly or indirectly, the address of the subsequent microinstruction. In the case of a conditioned jump microinstruction, the non-sequential addressing of the next microinstruction is indicated by the occurrence of a determined condition, directly or indirectly shown by a field of the same microinstruction.

In the format of such microinstructions, bit fields of sizes suitable to carry out different operations (that is, logical/arithmetical operations or transfer operations) do not remain available to carry out conditioned jumps to several different and independent addresses owing to the occurrence of several different conditions. In fact, this last feature would require that the microinstruction have the capability of providing several addresses and several jump conditions at the same time.

OBJECT OF THE INVENTION

Accordingly, it is an object of the present invention to overcome the limitations of the microprogrammed control unit by providing multiple branch capability.

SUMMARY OF THE INVENTION

Accordingly, associated with a microprogram memory of the present invention are a first auxiliary read/write memory having reduced capacity and low parallelism, a second auxiliary read/write memory having reduced capacity and high parallelism, and a priority network. The first auxiliary memory is devoted to store addressing codes of the second auxiliary memory. The second auxiliary memory is devoted to store several codes for identification of conditions, several branch addresses and possibly other information.

When the microprogram memory is addressed, the first auxiliary memory is addressed also, which in turn addresses the second auxiliary memory. In such a way, at each machine cycle there is available a microinstruction read out from the microprogram memory as well as a set of information read out from the second auxiliary memory and representative of branch conditions, branch addresses or much more. A microinstruction may, therefore, be completed by other information and it is as if the microinstruction length is increased. In such a way, by one microinstruction so completed, logical/arithmetical operations or transfers can be executed jointly with the examination of several conditions and the jump to one of several addresses.

BRIEF DESCRIPTION OF THE DRAWINGS

These and other features and advantages will best be understood in light of the following description of the preferred embodiment of the present invention together with the description of the drawings in which.

DESCRIPTION OF THE PREFERRED EMBODIMENT

Figure 1A:
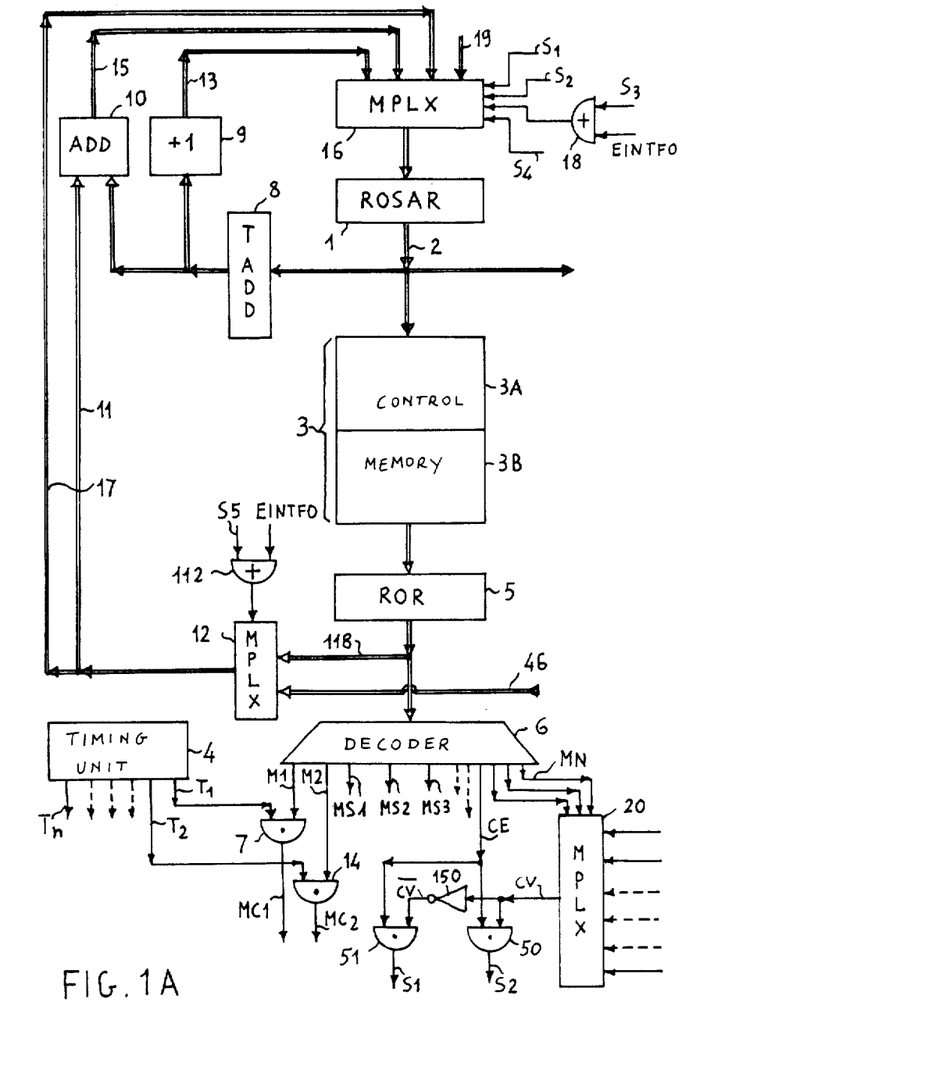
FIGS. 1A and 1B jointly show a preferred embodiment of the microprogrammed control unit according to the present invention.
Figures 1B, 6:
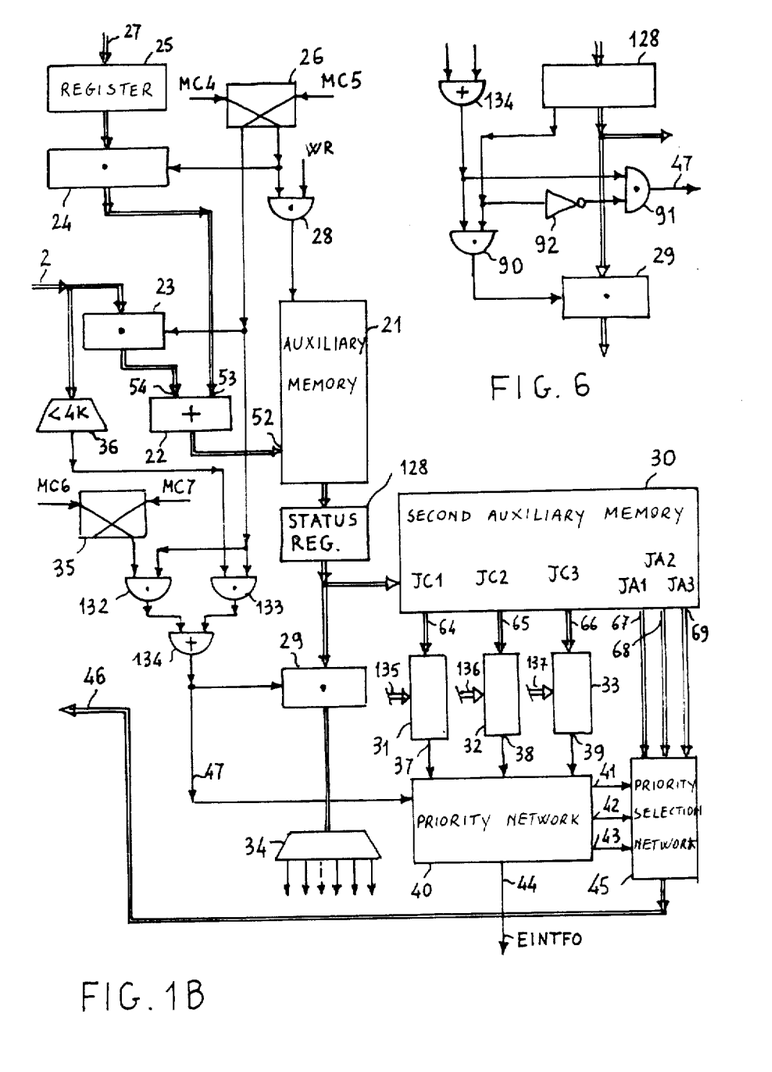
FIG. 6 shows a possible modification of the circuitry arrangement of the microprogrammed control unit according to the present invention.

FIGS. 1A and 1B jointly show, in block diagram, a preferred embodiment of the microprogrammed control unit with multiple branch capability. Such a microprogrammed control unit comprises a conventional and known portion (that shown in FIG. 1A) and an additional portion (that shown in FIG. 1B) of the present invention. In FIG. 1A, a conventional control unit is comprised of a register 1 (or ROSAR) for control memory addressing whose outputs are connected through a channel 2 to the addressing inputs of a control memory 3. Preferably, such a control memory 3 is comprised of two portions: a read only portion 3A and a read/write portion 3B. In such a way, some microprograms of general and frequent use may be permanently stored in portion 3A while some microprograms of infrequent use (for example, for diagnostic purpose) or for the execution of a particular operation may be stored in portion 3B whenever required.

The control memory 3 is a 32-bit word by 32K word memory of which 4K words are read only and 28K words are read/write. The outputs of control memory 3 are connected to the inputs of an output register 5 (ROR). The outputs of register 5 are connected to the inputs of a decoding network 6 which decodes the microinstruction in a set of microcommands $M_1$, $M_2$, through $M_N$.

A timing unit 4 of a known type, such as is described in U.S. Pat. Nos. 4,134,073; 3,599,011; and 3,418,498, generates on a suitable number of outputs, some cyclical timing pulses $T_1$, $T_2$, through $T_M$. The timing pulses are suitably AND'ed with the microcommands so as to obtain some suitably timed microcommands during each machine cycle. FIG. 1A shows, for example, that $T_1$ and $M_1$ generate through an AND gate 7 the timed microcommand $MC_1$ and $T_2$, and $M_2$ generates through an AND gate 14 the timed microcommand $MC_2$. The timed microcommands control the several elementary operations developing during a machine cycle in both the control unit 3 and the processing unit controlled by the control unit 3, such as the loading of registers, the starting of memory cycles, the enabling of gates, and so on.

Register ROSAR 1 receives the address used to address memory 3 from the output set of a multiplexer 16. The address is formed by incrementing by one unit the previous address, by adding a jump displacement K defined by the microinstruction in progress to the previous address, or by replacing the previous address with a new absolute address. In FIG. 1A, the output channel 2 of register ROSAR 1 is connected to the inputs of a buffer register T ADD 8. The outputs of register T ADD 8 are connected to the inputs of an incrementing network 9 and to a first set of inputs of a summing network ADD 10.

Summing network 10 receives the bits of a field of the microinstruction contained in register ROR 5 on a second set of inputs through a channel 11 and a multiplexer 12. The outputs of incrementing network 9 are connected through a channel 13 to a first input set of a multiplexer 16. Through this path, ROSAR 1 receives the previous address incremented by one to its inputs. The outputs of summing network 10 are connected through a channel 15 to a second input set of multiplexer 16. Through this path, ROSAR 1 receives the previous address incremented by a displacement K to its inputs. The outputs of multiplexer 12 are connected through a channel 17 to a third input set of multiplexer 16. Through this path, ROSAR 1 receives an absolute address to its inputs. Another addressing path is comprised of a channel 19 connected to a fourth input set of multiplexer 16. Channel 19 may receive, for example, addressing codes from registers (not shown) in the data processing system. Obviously, the several input sets of multiplexers 16 and 12 are enabled in a mutually exclusive way by suitably timed microcommands or by suitable control signals.

For example, FIG. 1A shows that multiplexer 16 is controlled by four selection signals $S_1$, $S_2$, $S_3$, and $S_4$ (for simple description purposes, four signals are given even if the control may be practically performed in coded form by only two signals) and multiplexer 12 by signal $S_5$. Signal $S_1$, for example, enables the transfer from channel 13 to ROSAR 1, signal $S_2$ the transfer from channel 15 to ROSAR 1, signal $S_3$ (through an OR gate 18) the transfer from channel 17 to ROSAR 1, and signal $S_4$ the transfer from channel 19 to ROSAR 1. Signal $S_5$ when present enables (through an OR gate 112) the transfer of information from an input channel 46 to the output of multiplexer 12. When signal $S_5$ is not present, the transfer is enabled from the output channel 118 of ROR 5 to the output of multiplexer 12.

FIGS. 2A, 2B, 2C, and 2D show the format of the most common type of microinstructions used in data processing systems.

Figure 2A:
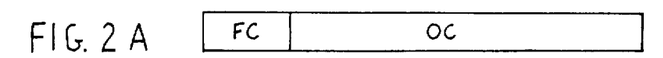
FIGS. 2A, 2B, 2C and 2D show the format commonly used for the microinstruction in microprogrammed control units, including therein the object of the invention.

FIG. 2A shows the format of an operative microinstruction. It is comprised of a function code FC and an operative code OC.

Figure 2B:
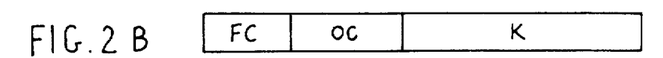

FIG. 2B shows the format of an unconditioned relative jump microinstruction. It is comprised of a function code FC, a possible operative code OC and a jump displacement K.

Figure 2C:
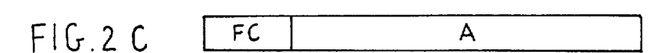

FIG. 2C shows the format of an unconditioned absolute jump microinstruction. It is comprised of a function code FC and a jump address A.

Figure 2D:
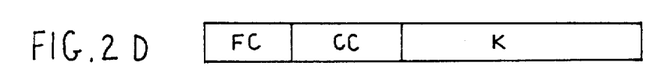

FIG. 2D shows the format of a conditioned relative jump microinstruction. It is comprised of a function code FC, a condition code CC and a jump displacement K.

An operative microinstruction always requires the sequential addressing of the next microinstruction and, when it is contained in ROR 5, generates a microcommand MS1 through decoding network 6 which, suitably timed, generates in turn signal $S_1$. In this way, the address of the microinstruction contained in ROR 5, the same address being contained in T ADD 8, is incremented by one and transferred through multiplexer 16 to ROSAR 1 where it addresses the next microinstruction. An unconditioned (absolute or relative) jump microinstruction contained in ROR 5 generates one of two microcommands MS3 and MS2 through decoding network 6 which, suitably timed, generate in their turn $S_3$ or $S_2$. The address which is loaded into ROSAR 1 is a new address equal to A (the address transferred from ROR 5 through multiplexer 12 and channel 17) or an address equal to the previous one (contained in T ADD 8) incremented by K (K being the jump displacement transferred from ROR 5 through multiplexer 12 and channel 11). A conditioned jump microinstruction provides two alternatives for the development of the next address.

The condition code CC contained in such a microinstruction specifies that a particular condition must be examined in order to decide which address has to be the next one. The condition code CC (FIG. 1A) substantially operates as a selection code for a multiplexer 20 which receives on its several inputs a plurality of signals representative of conditions or statuses which occur within the data processing system. In data processing systems, many conditions are often to be considered; for example, carry signals resulting from arithmetical operations, overflow signals, signals of particular operative modes (initializing, privileged), signals indicating particular characteristics of the operands (decimal, packed, binary), etc. The condition code CC selects through multiplexer 20 one and only one of these conditions. If it is verified (that is, at logical level 1), multiplexer 20 outputs a verified condition signal CV. Also, through decoder 6, the conditioned jump microinstruction generates a microcommand CE to enable the condition examination.

CE and CV are applied to the inputs of an AND gate 50, and CE and CV (obtained from CV through an inverter 105) are applied to the inputs of an AND gate 51. If the condition CV is verified, a signal $S_2$ appears on the output of AND gate 50. If the condition CV is not verified, a signal $S_1$ appears on the output of AND gate 51. Signals $S_1$ and $S_2$ are used as selection commands of multiplexer 16.

The control unit portion of FIG. 1B, where the inventive aspects are located, will now be discussed. Besides the elements already shown in FIG. 1A and known in the prior art, the control unit comprises a first auxiliary read/write memory 21, a second auxiliary read/write memory 30, a plurality of selection and condition examination networks 31, 32 and 33; a priority network 40 coupled to the selection and condition examination networks 31, 32, and 33; and a jump address selection network 45.

Auxiliary network 21 has preferably an 8-bit word as to that of control memory 3 and a reduced capacity (for example, 4K bytes). The addressing inputs 52 of memory 21 are connected to the outputs of an OR gate set 22 having two input sets 53 and 54. OR gate set 22 receives an input set 54, through an AND gate set 23, the least significant portion of the memory address present on channel 2. Such a portion must be sufficient to address every position of auxiliary memory 21 (in the preferred embodiment shown, this address portion comprises 12 bits). Through an AND gate group 24, OR gate group 22 receives further on its input set 53 an address latched into a register 25. Register 25 may be loaded with addresses coming from suitable machine channels which are not shown here. The control inputs of AND gate groups 23 and 24 are respectively connected to the inverted output and to the direct output of a flip-flop 26. This flip-flop is set/reset by suitable microcommands MC4 and MC5. When flip-flop 26 is set, it indicates that the control unit is in an initializing phase. During this phase, AND gate group 24 is enabled while AND gate group 23 is locked.

Auxiliary memory 21, therefore, is addressed by the addresses contained in register 25 for storing each addressed word (byte) as binary codes. The binary codes are received through an input channel 27 which is connected in turn to suitable machine channels (not shown). This enables auxiliary memory 21 to be initialized. In this condition, auxiliary memory 21 receives write timed commands WR through an AND gate 28 enabled by the direct output of flip-flop 26. When flip-flop 26 is reset, the control unit is in an operative phase. In this case, the same address used to address control memory 3 addresses auxiliary memory 21 for read operations through AND gate set 23 (enabled during this phase). Since auxiliary memory 21 has a capacity lower than that of control memory 3, only the least significant portion of the address will be used (in the preferred embodiment shown, this portion comprises 12 bits).

The outputs of auxiliary memory 21 are connected to the inputs of a register 128 (STATUS REG.) whose outputs in turn are connected to the addressing inputs of the second auxiliary read/write memory 30. This memory suitably has a reduced number of addressable portions whose number is equal to or lower than the addressing capacity determined by the 8-bit word of auxiliary memory 21. In the embodiment shown, because the 8-bit word of auxiliary memory 21 and auxiliary read/write memory 30 may have 256 addressable positions, each one stores a 48-bit word.

The outputs of register 128 are further connected to the inputs of an AND gate group 29 whose outputs are connected to the inputs of a decoder 34. Decoder 34 decodes the word contained in register 128 and read out from auxiliary memory 21 and provides a set of additional microcommands on its outputs which add to the set of microcommands produced by decoder 6. Therefore, auxiliary memory 21 has among its functions one that generates some additional microcommands through decoder 34.

A control network enables AND gate group 29 only for certain conditions and assures that the additional microcommands be generated in particular circumstances only. The network is comprised of two input AND gates 132 and 133, a two input OR gate 134, a flip-flop 35 and a decoder 36. Decoder 36 has its inputs connected to channel 2 and an output which rises to logical ONE when the address on channel 2 is less than 4K. The output of decoder 36 is connected to an input of AND gate 133. The second input of AND gate 133 is connected to the inverted output of flip-flop 26. The output of AND gate 133 is connected to an input of OR gate 134, whose output is connected to the enabling input of AND gate group 29. Thus auxiliary memory 21 generates additional microcommands only when the microinstruction addresses are less than 4K. For addresses greater than 4K, this function of memory 21 is inhibited to avoid the association of the same complementary microcommands to several different microinstructions having addresses which differ among them by multiples of 4K. Such a restriction may be removed by presetting flip-flop 35 by means of a suitable microcommand MC6.

The direct output of flip-flop 35 is connected to an input of a two inputs AND gate 132, whose second input is connected to the inverted output of flip-flop 26. The output of AND gate 132 is connected to an input of OR gate 134. Flip-flop 35 is reset by a microcommand MC7. When flip-flop 35 is set, AND gate group 29 is enabled even for microprogram addresses greater than 4K, provided the system is not in the initializing phase (flip-flop 26 is reset). In this case, the function of microcommand integration by means of additional microcommands is performed by auxiliary memory 21, even for microprogram addresses greater than 4K. This is useful for diagnostic purposes and, more generally, in case an operation of the control unit is established which uses limited and well-defined areas of the control memory, for example, pages with each one having a size of 4K words. In this case, auxiliary memory 21 may be successively loaded with complementary information relative to such pages. However, according to the invention, the main function of memory 21 is that of addressing auxiliary memory 30.

Auxiliary read/write memory 30 is devoted to storing in every addressable memory position a plurality of binary codes and more precisely:

(a) a plurality of jump condition selection codes JC1, JC2 and JC3. Each one of these codes selects one among several conditions which must be examined; and (b) a plurality of binary codes representative of absolute jump addresses JA1, JA2 and JA3.

Auxiliary read/write memory 30 has a plurality of output sets 64, 65, 66, 67, 68 and 69. Output sets 64, 65 and 66 are connected to the inputs of condition examination and selection networks 31, 32 and 33, respectively. Each one of these networks receives in addition input sets 135, 136 and 137, respectively, representative of conditions which occur within the data processing system comprising the described control unit. As already mentioned, the conditions may be of various types. These conditions are provided in groups on input sets 135, 136 and 137. Each selection network is allowed, based on the jump condition code, to select that particular input of the input set (135, 136 and 137, respectively) used to transfer to the same network a particular condition. If such a condition is present or verified, the selection network emits a signal of verified condition on an output (37, 38 and 39, respectively) at logical ONE. Outputs 37, 38 and 39 are connected to the inputs of a priority network 40.

Priority network 40 selects among the several verified condition signals present at the same time on its inputs that one which has higher priority and transfers it to one of several selection outputs 41, 42 and 43. It also further provides on an output 44 a forced jump signal EINTFO whenever a condition is verified and whenever the condition codes JC1, JC2 and JC3 coming from memory 30 impose a forced jump irrespective of any condition being verified.

Selection outputs 41, 42 and 43 are connected to the control inputs of a selector 45, which receives at its input sets the jump addresses JA1, JA2 and JA3 through the outputs 67, 68 and 69, respectively, of auxiliary read/write memory 30. One of these jump addresses is selected and applied through lead group 46 to an input set of multiplexer 12, FIG. 1A. Signal EINTFO controls multiplexer 12 through OR gate 112 and multiplexer 16 through OR gate 18.

Priority network 40 is enabled by a signal present on lead 47 from the output of OR gate 134. In other words, the mechanism of multiple examination of several jump conditions intervenes only when the system is not in the initializing phase and for addresses of control memory 3 less than 4K. It may intervene, however, for addresses greater than 4K if flip-flop 35 has been set.

Figure 3:
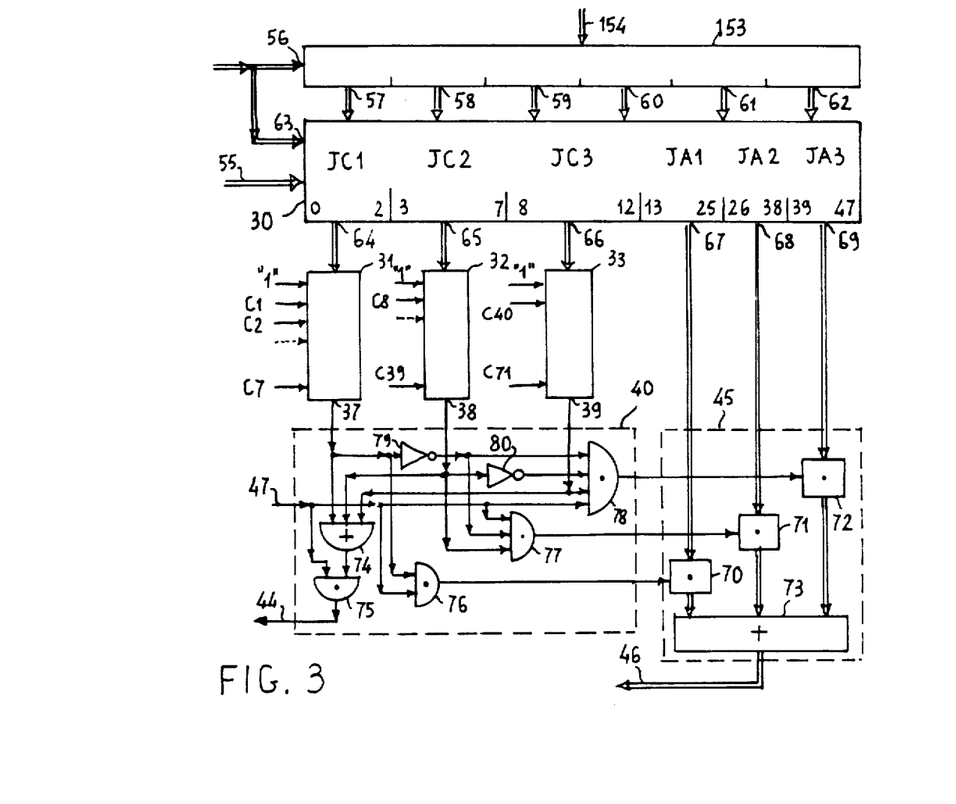
FIG. 3 shows in more detail some elements of the microprogrammed control unit with multiple branch capability.

FIG. 3 shows in greater detail auxiliary read/write memory 30, condition networks 31, 32 and 33, priority network 40 and selector 45. Auxiliary read/write memory 30 suitably has a 48-bit word and a reduced capacity (for example, 256 words) and it is formed by six independent modules arranged in parallel. Auxiliary read/write memory 30 is loaded through a demultiplexer 153 from a channel 154 of the data processing system.

The function of demultiplexer 153 is to adjust the word size of auxiliary read/write memory 30 to the one of channel 154. For example, channel 154 may carry an 8-bit word. Suitable microcommands, applied to control inputs 56 of demultiplexer 153, allow the transfer of the information present on channel 154 to one of the output sets 57, 58, 59, 60, 61 and 62 connected to as many data input sets of memory 30 as are required. The same microcommands applied to control inputs 56 are applied to some control inputs 63 of memory 30 and are allowed to select one of the six modules constituting memory 30. The addressing of the memory position is obtained through inputs 55 connected to the outputs of status register 128, FIG. 1B.

The reading of auxiliary read/write memory 30 may be performed in parallel for all the modules so as to read out 48 bits for every addressed position. In the described embodiment, the read information has the following format:

bits 0-2: first code JC1 identifying one out of 8 jump conditions, bits 3-7: second code JC2 identifying one of 32 jump conditions, bits 8-12: third code JC3 identifying one of 32 jump conditions, bits 13-25: jump address JA1 coupled to first code JC1, bits 26-38: jump address JA2 coupled to second code JC2, bits 39-47: jump address JA3 coupled to third code JC3.

The bits 0-2 are applied through output set 64 to the control inputs of condition network 31 substantially formed by a multiplexer having 8 inputs and an output. A logical ONE is permanently applied to an input of network 31 while 7 different conditions $C_1$ through $C_7$ are applied to the other inputs.

The bits 3-7 are applied through output set 65 to the control inputs of condition selection network 32 substantially formed by a multiplexer having 32 inputs and an output. A logical ONE is permanently applied to an input of network 32 while 31 different conditions $C_8$ through $C_{39}$ are applied to the other inputs.

The bits 8-12 are applied through output set 66 to the control inputs of condition selection network 33 substantially formed by a multiplexer having 32 inputs and an output. A logical ONE is permanently applied to an input of network 33 while 31 different conditions $C_{40}$ through $C_{71}$ are applied to the other inputs.

The bits 13-25 are applied through output set 67 to the inputs of an AND gate set 70.

The bits 26-38 are applied through output set 68 to the inputs of an AND gate set 71.

The bits 39-47 are applied through output set 69 to the inputs of an AND gate set 72.

The output sets of AND gate sets 70, 71 and 72 are connected to as many input sets of an OR gate set 73 whose outputs are connected through channel 46 to an input set of multiplexer 12, FIG. 1A. AND gate groups 70, 71, 72 and 73 form selector 45 of FIG. 1B.

Priority network 40 is formed by an OR gate 74, by AND gates 75, 76, 77 and 78, and by two inverters 79 and 80. OR gate 74 has its inputs connected to outputs 37, 38 and 39 of multiplexers 31, 32 and 33 respectively, and the output connected to an input of AND gate 75. A second input of AND gate 75 is connected to lead 47. The output of AND gate 75 is connected to lead 44. Output 37 of multiplexer 31 is connected to an input of AND gate 76 which has a second input connected to lead 47. The output of AND gate 76 is connected to the enabling input of AND gate set 70. It is therefore clear that when one of the conditions selected by multiplexer 31 is verified, that is, output 37 of multiplexer 31 is at logical ONE and network 40 is enabled by a logical ONE present on lead 47, signal EINTFO at logical ONE is generated on lead 44 and jump address JA1 is transferred to channel 46.

Output 38 of multiplexer 32 is connected to an input of AND gate 77 which has a second input connected to lead 47 and a third input connected to output 37 of multiplexer 31 through inverter 79. The output of AND gate 77 is connected to the enabling input of AND gate set 71. It is therefore clear that when one of the conditions selected by multiplexer 32 is verified but none of the conditions selected by multiplexer 31 is verified, and furthermore that network 40 is enabled by a logical ONE present on lead 47, signal EINTFO at logical ONE is generated on lead 44 and jump address JA2 is transferred to channel 46. Output 39 of multiplexer 33 is connected to an input of AND gate 78 which has input connected to lead 47, a third input connected to output 37 of multiplexer 31 through inverter 79 and a fourth input connected to output 38 of multiplexer 32 through inverter 80. It is therefore clear that when one of the conditions selected by multiplexer 33 is verified but, at the same time none of the conditions selected by multiplexers 31 and 32 is verified, and furthermore network 40 is enabled by a logical ONE present on lead 47, signal EINTFO at logical ONE is generated on lead 44 and jump address JA3 is transferred to channel 46.

Figure 4:
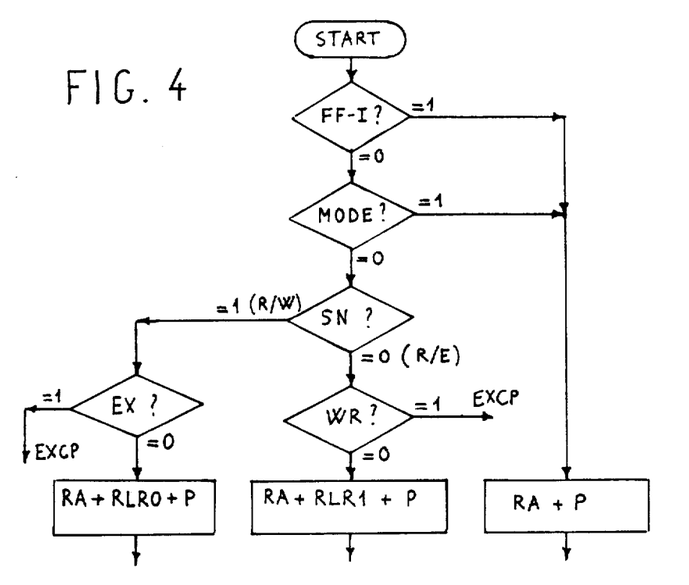
FIG. 4 is a flow diagram of the development of an operative sequence in a microprogrammed control unit known in the prior art.

Having described a preferred embodiment of the invention, it is convenient to point out its advantages by means of some examples. A first example relates to the firmware routine which develops absolute memory addresses starting from relative addresses. It is known that in modern data processing systems in order to free the program writing and the address settlement from the real memory positions, relative or conventional addresses are used; the data processing systems suitably process such addresses to obtain an absolute memory address from a relative address. The computation may be performed in different ways according to the particular operative statuses of the system. In addition, together with the computation, it is necessary to perform several controls to secure that, during write operations, a memory zone exclusively devoted to read operations is not addressed and so on. FIG. 4 shows in a flow diagram the absolute address computation performed in a conventional way.

Starting from an initial condition (START) where a program instruction specifying an operand located in a relative address RA has been read out, it has to be verified by means of a first conditioned jump microinstruction whether the system is in an initializing status or not; that is, whether a flip-flop FF—I is set (FF—I=1) or reset (FF—I=0).

If the system is in an initializing status, the absolute address is given by the sum RA+P, where P is the content of a register which defines a protected memory zone. If the system is not in an initializing status, it is to be verified whether the system is in a privileged operative status or in a normal status (user); that is, whether a flip-flop MODE is set (MODE=1) or reset (MODE=0).

If the system is in a privileged status, the operation RA+P is executed. In the opposite case, an additional control is performed; that is, it is verified whether the instruction refers to a memory zone SN devoted to store information which can be read and written (SN=1(R/W)) or only read out (SN=0(R/E)). If SN=1, it is to be verified whether the instruction defines, by means of its operative code, a memory read/write operation or a non-memory operation, that is, an executive type (EX=1) operation such as arithmetical/logical operation on information stored in working registers or an information transfer from working register to working register not involving the memory.

If the instruction is executive, an exception is pointed out and an exception treatment routine EXCP is performed; otherwise, the absolute address computation is performed by adding to the relative address the information contained in a register RLR0, as well as the information contained in a register P. If SN=0, that is the instruction refers to a memory zone devoted to store information which can be read out only, it is verified whether the instruction is a write instruction (WR=1).

If the instruction is a write instruction, an exception is pointed out and an exception treatment routine is performed. In the contrary case, the absolute address is calculated.

It is clear that the development by microinstructions of the above-described microprogram requires the execution of a separate microinstruction for each condition examination. Thus the examination of conditions FF—I, MODE, SN and WR requires four conditioned jump microinstructions to be performed during four machine cycles. In addition, the four microinstructions require four memory positions to be stored. The already described microprogrammed control unit has, on the contrary, the advantage to allow the simultaneous examination of several conditions.

Figure 5:
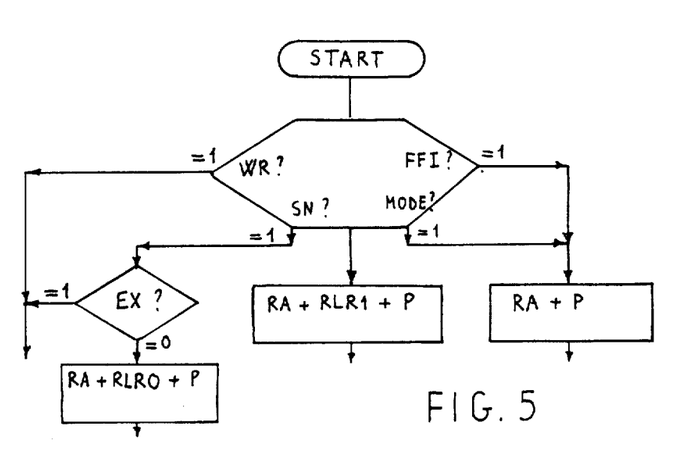
FIG. 5 is a flow diagram of the development of the same operative sequence of FIG. 4 in a microprogrammed control unit of the present invention.

FIG. 5 shows in flow diagram the calculus of an absolute address by using the described control unit. Starting from the same previous initial condition, the conditions FF—I, MODE, SN and WR are examined by means of a single jump microinstruction by using the information associated to the jump microinstruction and stored in a position of auxiliary read/write memory 30. The only constraint to be considered during such simultaneous examination is the priority order according to which the several conditions must be verified with such an order having to correspond to the logical order according to which the examination of the conditions must occur. Thus the condition FF—I which logically precedes the others must belong to condition set $C_1$ through $C_7$ (FIG. 3), the condition MODE must belong to condition set $C_8$ through $C_{39}$, the condition SN must belong to condition set $C_{40}$ through $C_{71}$, and the condition WR must belong to the set of conditions directly examined by the microinstruction decoded by decoder 6.

It is clear that the microprogram development requires in this case a lower number of machine cycles and that the use of two auxiliary memories 21 and 30 is widely compensated by the lesser memory size occupation of control memory 3.

A further advantage of the microprogrammed control unit is to allow the correction of microprogramming errors and to remedy possible faults of the control memory.

It has already been mentioned that control memory 3 is formed by a read only zone and by a read/write zone. While the read/write memories are dynamic (the information stored therein is lost if the power supplied fails), the read only memories are static (the information stored therein is permanent). The use of static and permanent control memories is necessary to allow the start or initialization of the system. Also, such memories are more inexpensive and faster than the others. These memories have the inconvenience to be inalterable and so, if they have been programmed in a wrong way, they cannot be modified and the replacement of the components constituting the memory is required. The same inconvenience happens if, during the use, a fault occurs in particular positions of the control memory and causes the reading of wrong microinstructions. In this case by using the described control unit, it is possible to bypass the wrong microinstructions (owing to a fault or a microprogramming mistake).

It is clear that a wrong microinstruction is reached in a sequential way or by means of a jump starting from one or several previous microinstructions. It is therefore sufficient to associate to such previous microinstructions, each one of which will have a certain memory address ADDRi, in the positions of auxiliary read/write memory 21 having an equal address, an address code which points to a predetermined position of auxiliary memory 30. In such a predetermined position, a condition code to be examined will be written, which points to an always verified condition, that is to the condition "1" permanently applied to an input of multiplexer 31.

A jump address JA1 is associated with this code, allowing the jump address to jump to a memory position within memory 3 and particularly within read/write zone 3B of this memory. In such a memory position, a correct microinstruction will be substituted for the wrong microinstruction. This correct microinstruction will be followed in turn by a jump microinstruction which will refer to the microinstruction logically, subsequent to the wrong one which is therefore bypassed.

It is clear that the previous description only relates to a preferred embodiment of the invention and that several modifications may be made without departing from the scope of the invention. For example, auxiliary memory 30 may contain a number of jump condition groups greater or less than 3 and correspondingly a number of jump address groups greater or less than 3.

The jump condition networks, the priority network 40 and the address selector 45 will be suitably modified in order to consider this fact. In addition, the number of jump condition groups and the number of jump address groups stored in memory 30 do not necessarily have to coincide. For example, the number of jump condition groups stored in auxiliary memory 30 may be greater than the number of jump address groups, and one or several jump condition groups may recall some jump addresses contained in other machine registers when a condition is verified. In addition, it is possible to use auxiliary memory 21 and auxiliary memory 30 separately. In fact, it has been explained that the binary codes stored in memory 21 may be used both as addresses for memory 30 and codes for the generation of additional microcommands obtained through decoder 34. The double function carried out by such codes imposes a reciprocal interdependence among additional microcommands and addresses of memory 30.

This restriction may be overcome as shown in FIG. 6 by means of some additional logical elements which completely free the two functions carried out by the codes stored in memory 30. FIG. 6 shows some elements already shown in FIG. 1B, that is register 128, AND gate group 29 and OR gate 134.

In FIG. 6, the output of OR gate 134 does not directly enable AND gate group 29 and priority network 40 through lead 47, but only indirectly through a two input AND gate 90 and a two input AND gate 91. The two input AND gate 90 receives to a first input the signal coming from the output of OR gate 134 and to the second input a signal coming from an output of register 128. This last signal corresponds, for example, to the most significant bit contained in register 128. The output of AND gate 90 is connected to the enabling input of AND gate group 29. The two input AND gate 91 receives to one input the signal coming from the output of OR gate 134 and to the other input through an inverter 92 the signal coming from an output of register 128, that is the signal corresponding to the most significant bit in inverted form.

It is clear that in such a case the generation of the additional microcommands through decoder 34 and the enabling of the multiple jump network occur in a mutuallly exclusive way.

A further noteworthy consideration relates to the criteria for a relative priority group assignment of the several jump conditions. It has previously been noted that the several jump conditions are organized according to decreasing priority groups and that a jump condition belonging to a greater priority group prevails, when it is examined and verified, over a jump condition belonging to a lesser priority group which is also examined and verified.

It some cases, it may be necessary to examine only a condition belonging to a lesser priority group. Within the highest priority condition groups, this may be obtained by imposing that auxiliary memory 30 selects for examination a condition which would certainly not be verified.

This involves in the microprogram design a careful and strict examination of the several machine statuses. In order to avoid this burden, it is sufficient to insert in the highest priority condition groups a condition which is never verified and corresponds to a "0" permanently applied to one of the inputs of multiplexers 31 and 32 of FIG. 1B and FIG. 3. In the same way, as previously pointed out, a "1" may be permanently applied to one of the inputs in order to obtain the capability of an unconditioned jump.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A microprogrammed control unit with multiple branch capability comprising a main control memory, an addressing register connected to the addressing inputs of said main control memory, a main output register connected to the outputs of said main control memory, a microcommand decoder connected to the outputs of said main output register, an addressing network for generating sequential addresses and absolute or relative, conditioned or unconditioned, jump addresses, said addressing network being controlled by microcommands received from outputs of said decoder, said microprogrammed control unit further comprising:

a first auxiliary read/write memory having address inputs and outputs and addressed by output signals from said addressing register and storing first binary codes at addressable locations;

an auxiliary output register connected to the outputs of said first auxiliary memory and storing a first binary code read out from said first auxiliary memory;

a second auxiliary read/write memory having addressable locations and addressed by said first binary code stored in said auxiliary output register and storing at each addressable location a plurality of condition selection codes and a plurality of jump addresses;

a plurality of condition selection networks, each one having first inputs receiving a plurality of condition signals, second selection inputs receiving one of said condition selection codes read out from said second memory, and providing to an output one condition signal out of said plurality;

a priority selection network having a plurality of inputs, each one connected to the output of one of said condition selection networks and receiving said one condition signal, and providing to a plurality of outputs an address selection code; and a jump address selection network having control inputs receiving said address selection code, a plurality of input sets connected to a plurality of output sets of said second auxiliary memory and receiving a plurality of jump addresses and an output set connected to said addressing network and providing a jump address selected out of said plurality received at said input sets.

2. A microprogrammed control unit according to claim 1 wherein said first auxiliary memory has lesser addressable locations than said main control memory and further comprising control logical circuits, controlled by microcommands, to inhibit the outputs of said priority selection network when the address stored in said addressing register exceed the number of addressable locations of said first auxiliary memory.

3. A microprogrammed control unit according to claim 2 further comprising a second decoding network for additional microcommand generation, provided with inputs connected to the outputs of said auxiliary output register.

4. A microprogrammed control unit according to claim 2 further comprising a second decoding network for additional microcommand generation, and a group of control gates, the inputs of said control gates being connected to the outputs of said auxiliary output register, the outputs of said control gates being connected to the inputs of said decoding network, the outputs of said control gates being inhibited by control signals generated by said control unit when the address stored in said addressing register exceed the number of addressable locations of said first auxiliary memory.

* * * * *

UNITED STATES PATENT AND TRADEMARK OFFICE
CERTIFICATE OF CORRECTION

PATENT NO. : 4,446,518
DATED : May 1, 1984
INVENTOR(S) : Angelo Casamatta

It is certified that error appears in the above-identified patent and that said Letters Patent are hereby corrected as shown below:

Please change the Assignee from "Honeywell Information Systems Inc., Waltham, Mass." to --Honeywell Information Systems Italia, Milan, Italy--.

Signed and Sealed this

Eighth Day of January 1985

[SEAL]

Attest:

*Attesting Officer*

GERALD J. MOSSINGHOFF
*Commissioner of Patents and Trademarks*